(12) United States Patent
Nakazawa et al.

(10) Patent No.: US 9,410,625 B2
(45) Date of Patent: Aug. 9, 2016

(54) COMBINED OIL CONTROL RING

(71) Applicant: KABUSHIKI KAISHA RIKEN, Tokyo (JP)

(72) Inventors: Masahiro Nakazawa, Kashiwazaki (JP); Tadahiko Watanabe, Kashiwazaki (JP); Satoshi Koizumi, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/351,393

(22) PCT Filed: Oct. 10, 2012

(86) PCT No.: PCT/JP2012/076178
§ 371 (c)(1),
(2) Date: Apr. 11, 2014

(87) PCT Pub. No.: WO2013/054807
PCT Pub. Date: Apr. 18, 2013

(65) Prior Publication Data
US 2014/0265149 A1    Sep. 18, 2014

(30) Foreign Application Priority Data
Oct. 14, 2011   (JP) .................................. 2011-226929
Nov. 25, 2011   (JP) .................................. 2011-257463

(51) Int. Cl.
*F16J 9/00* (2006.01)
*F16J 9/12* (2006.01)
*F16J 9/06* (2006.01)

(52) U.S. Cl.
CPC ... *F16J 9/12* (2013.01); *F16J 9/068* (2013.01)

(58) Field of Classification Search
CPC ....................................... F16J 9/12; F16J 9/068
USPC ........................................................... 277/467
See application file for complete search history.

(56) References Cited

U.S. PATENT DOCUMENTS 3,075,816 A * 1/1963 Harris ..................... F16C 33/04
                                                      384/420
4,834,400 A * 5/1989 Lebeck .................. F16C 29/02
                                                      277/399

(Continued)

FOREIGN PATENT DOCUMENTS

GB    2 263 326 A    7/1993
JP    59-099153 U    7/1984

(Continued)

OTHER PUBLICATIONS

International Search Report issued in PCT/JP2012/076178, mailed on Dec. 11, 2012.

(Continued)

*Primary Examiner* — Kristina Fulton
*Assistant Examiner* — Nathan Cumar
(74) *Attorney, Agent, or Firm* — Birch, Stewart, Kolasch & Birch, LLP (57) ABSTRACT

To provide a combined oil control ring with a function of preventing the separate rotation of side rails for a long period of time even under fretting fatigue, seating tabs of a spacer expander are provided with substantially longitudinal projections and recesses on their side-rail-pushing surfaces in a circumferential direction, the width m of a bottom surface being larger than the circumferential length m' of the top surface in each projection, and a surface connecting the top surface to a recess surface having a bulging shape.

10 Claims, 5 Drawing Sheets

(56) References Cited

U.S. PATENT DOCUMENTS

| | | | |
|---|---|---|---|
| 5,161,805 A | 11/1992 | Watanabe et al. | |
| 7,044,472 B2 * | 5/2006 | Takahashi | F16J 9/067 277/434 |
| 7,243,596 B2 | 7/2007 | Usui et al. | |
| 2003/0090066 A1 | 5/2003 | Takahashi et al. | |
| 2006/0169135 A1 | 8/2006 | Usui et al. | |
| 2010/0176557 A1 * | 7/2010 | Peter-Klaus et al. | 277/460 |

FOREIGN PATENT DOCUMENTS

| | | |
|---|---|---|
| JP | 60-014261 U | 1/1985 |
| JP | 62-175248 U | 11/1987 |
| JP | 2-044005 U | 3/1990 |
| JP | 3-193221 A | 8/1991 |
| JP | 5-087240 A | 4/1993 |
| JP | 5-106734 A | 4/1993 |
| JP | 6-069522 U | 9/1994 |
| JP | 2000-120867 A | 4/2000 |
| JP | 2001-132840 A | 5/2001 |
| JP | 1-078768 U | 10/2001 |
| JP | 2001-295926 A | 10/2001 |
| JP | 2003-148617 A | 5/2003 |
| JP | 2004-156472 A | 6/2004 |
| JP | 2005-069289 A | 3/2005 |
| WO | WO 01/77548 A1 | 10/2001 |

OTHER PUBLICATIONS

Written Opinion issued in PCT/JP2012/076178, mailed on Dec. 11, 2012.

* cited by examiner

COMBINED OIL CONTROL RING

FIELD OF THE INVENTION

The present invention relates to a combined oil control ring assembled in a piston in an internal combustion engine and comprising two side rails and a spacer expander for oil control, particularly to a combined oil control ring free from the separate rotation of side rails.

BACKGROUND OF THE INVENTION

To protect environment, automobile engines have recently been provided with improved fuel efficiency, lower emission, and higher power, and improvements have been conducted particularly to reduce the friction of sliding members of pistons for higher fuel efficiency. The reduction of the tension of piston rings is particularly important, and because 50% or more of the tension of all piston rings is occupied by that of an oil control ring, measures have been conducted to reduce its tension. However, the tension reduction of an oil control ring likely reduces its followability to a cylinder liner wall, resulting in increased oil consumption. Further, in a three-piece oil control ring comprising a spacer expander having upwardly extending projections, which are called seating tabs, for pushing inner surfaces of side rails to generate tension, two upper and lower side rails are likely rotated separately in a circumferential direction, so that their gaps may overlap each other. In such a case, a lubricating oil remaining in the gaps is conveyed into a combustion chamber of an internal engine, resulting in too much supply of the lubricating oil and excessive consumption of an oil.

To prevent side rails from rotating separately from a spacer expander, for example, Japanese Utility Model Application Publication 59-99153 A discloses the formation of pluralities of grooves or recesses on surfaces of pads (seating tabs). The formation of pluralities of grooves or recesses provides the seating tabs with large surface roughness to prevent the rotation of side rails.

Like Japanese Utility Model Application Publication 59-99153 A, Japanese Utility Model Application Publication 60-14261 A discloses a method for preventing the relative rotation of side rails to a spacer expander by making the curvature of nail portions (seating tabs) equal to the curvature of an inner surface of each side rail, in addition to roughening the contact surfaces of seating tabs.

Figure 8A:
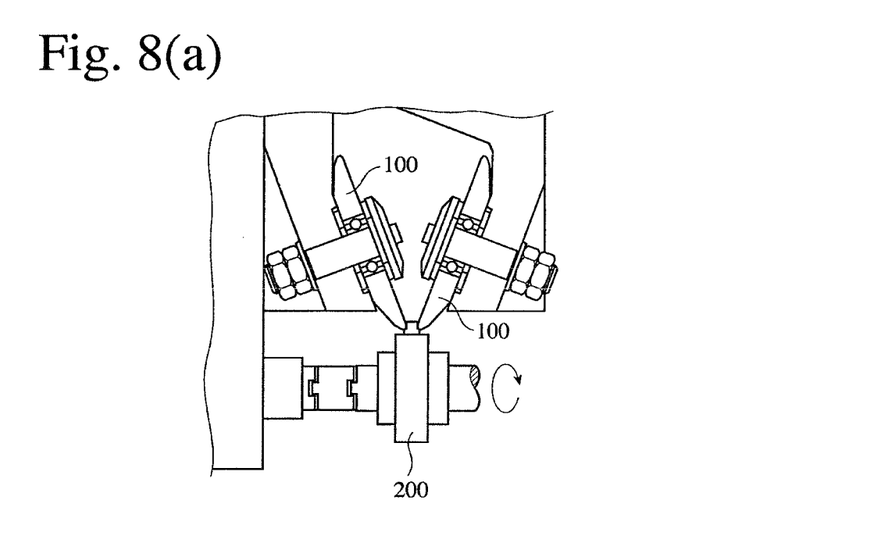
FIG. 8(a) is a schematic front view showing an apparatus for working seating tabs of a spacer expander.
Figure 8B:
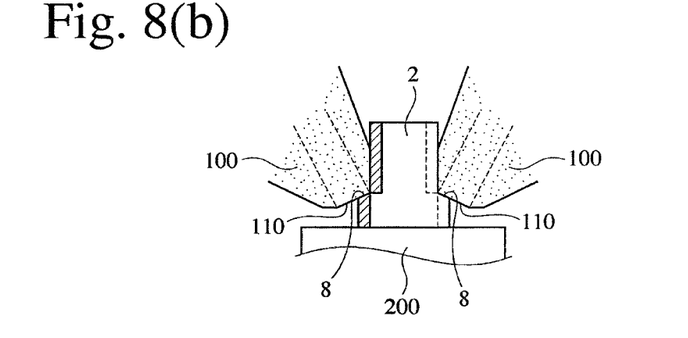
FIG. 8(b) is a cross-sectional view showing the arrangement of working rolls relative to a spacer expander in the apparatus for working seating tabs of a spacer expander.
Figure 8C:
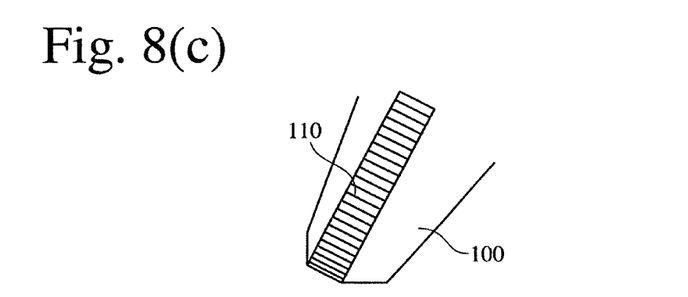
FIG. 8(c) is a partial view showing a working roll in the apparatus for working seating tabs of a spacer expander.

Japanese Utility Model Application Publication 1-78768 A discloses the formation of fine projections and recesses, for example, saw-like projections and recesses having a pitch of 25-250 µm and height of 15-180 µm, on seating tab surfaces, to increase friction resistance to prevent the rotation of side rails. As a method for working such seating tabs of a spacer expander, JP 3-193221 A discloses the use of an apparatus schematically shown in FIGS. 8(*a*) to 8(*c*), which presses tools having fine projections and recesses to side-rail-pushing surfaces of seating tabs, thereby transferring the projections and recesses of the tools to the side-rail-pushing surfaces.

Japanese Utility Model Application Publication 6-69522 A discloses the formation of projections of 0.006-0.060 mm on outer surfaces of seating tabs. In this case, only projections come into contact with side rails with large contact pressure, thereby preventing the relative rotation of side rails. It also describes that as a problem of Japanese Utility Model Application Publication 1-78768 A, decrease in an effective contact area accelerates the wear of inner surfaces of side rails, resulting in premature wearing of fine projections.

JP 2001-132840 A discloses the formation of projections as thick as 0.07-0.2 mm in center portions of seating tabs. Like Japanese Utility Model Application Publication 6-69522 A, this prior art utilizes the concept that the rotation of side rails is prevented by reducing contact areas, thereby increasing contact surface pressure. Because the projections are thick, such effects are kept for a long period of time.

JP 2003-148617 A discloses the formation of two or more grooves and three or more flat portions in a circumferential direction on seating tab surfaces, the total circumferential width of the flat portions being 30-70% of the circumferential width of seating tabs.

Any of the above conventional measures for preventing the separate rotation of side rails increases friction resistance on the contact surfaces of seating tabs of the spacer expander. To increase sliding resistance, projections are formed to adjust surface roughness, thereby increasing pushing pressure per a unit area. However, wearing occurs unexpectedly even when projections of sufficient height are formed, resulting in decreased friction resistance of contact surfaces, and thus the separate rotation of side rails. It has been found that the rotation of side rails is also affected by the swinging of a piston due to the deviation from roundness of a cylinder liner, clearance between a piston and a cylinder liner, and the shape of a piston, etc. An oil control ring having projections in seating tabs are subject to vibration, repeated or varying stress, etc., by this swinging phenomenon of a piston. As a result, it suffers so-called fretting fatigue, by which cracks propagate from damaged portions, resulting in destroying projections of sufficient height.

OBJECT OF THE INVENTION

An object of the present invention is to solve the above problems, providing a combined oil control ring capable of preventing the separate rotation of side rails for a long period of time, with resistance to fretting fatigue. Another object of the present invention is to provide a low-tension combined oil control ring capable of preventing the separate rotation of side rails.

DISCLOSURE OF THE INVENTION

The present invention basically provides a structure having seating tabs of a spacer expander with projections resistant to breakage due to fretting fatigue, thereby preventing the rotation of side rails for a long period of time. It also provides a structure capable of preventing the separate rotation of side rails even with a low-tension specification.

Thus, the combined oil control ring of the present invention comprises two upper and lower side rails, and a spacer expander sandwiched thereby, the spacer expander having seating tabs on the inner side for pushing inner surfaces of the side rails;

a side-rail-pushing surface of each of the seating tabs having substantially longitudinal projections and recesses arranged in a circumferential direction;

the width m of a bottom surface being larger than the circumferential length m' of a top surface in each projection; and a surface (side surface) connecting the top surface of each projection to the recess having a bulging shape.

The top surfaces of projections are preferably substantially in parallel to the side-rail-pushing surface. Particularly to prevent the rotation of side rails with increased friction resistance, the top surfaces of projections are preferably inclined from the side-rail-pushing surface. The top surfaces of projections more preferably have a spike waveform. The inclination angle of the top surfaces of projections is more preferably in a range of 1-30°.

A ratio (h/m) of the height h of the top surface from the recess surface to the width m of the bottom surface of the projection is preferably 0.5-10%. As a actual size, the height h of the top surface from the recess surface is preferably 0.5-20 μm, more preferably 0.5 μm or more and less than 6 μm.

In the combined oil control ring of the present invention, depending on a target tension, the total circumferential length of the top surfaces in each seating tab may be preferably 30-70%, 20-50%, or 15-25% of the circumferential length of the seating tab.

DESCRIPTION OF THE PREFERRED EMBODIMENTS

Figure 1:
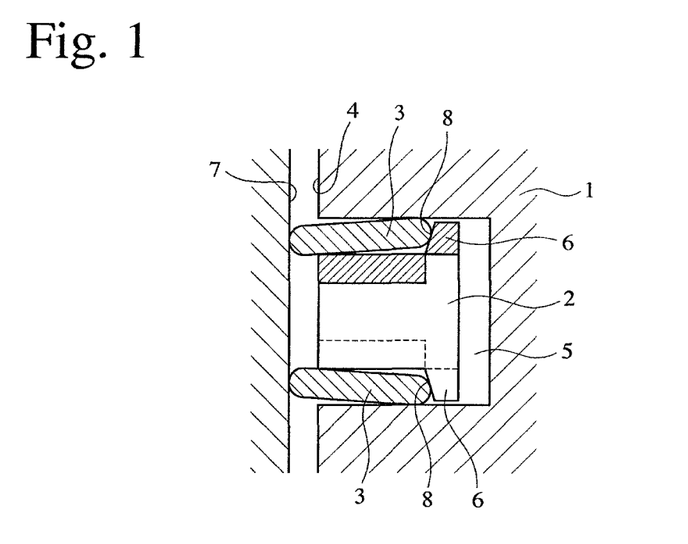
FIG. 1 is a cross-sectional view showing the combined oil control ring of the present invention.

The combined oil control rings according to embodiments of the present invention will be explained below referring to the drawings. FIG. 1 shows a combined oil control ring comprising a spacer expander 2 and a pair of side rails 3, 3 arranged above and below the spacer expander 2, which is mounted to an oil ring groove 5 of a piston 1. The spacer expander 2 has seating tabs 6 pushing inner surfaces of the side rails 3, 3 toward a cylinder inner wall 7 to obtain sealing between a piston peripheral surface 4 and the cylinder inner wall 7. Each seating tab 6 has a side-rail-pushing surface 8, which is inclined with an seating tab angle relative to the longitudinal direction of the piston to seal a side surface of the oil ring groove 5.

Figure 2:
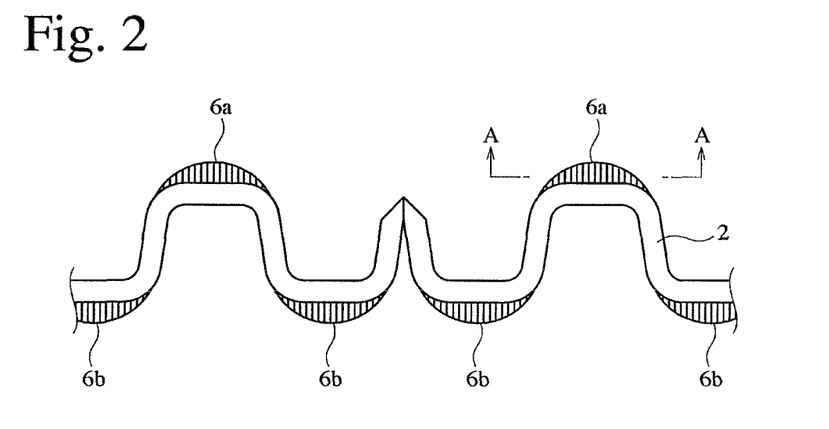
FIG. 2 is a view showing part of the spacer expander of the present invention, which has seating tabs provided with substantially longitudinal projections and recesses arranged in a circumferential direction on each side-rail-pushing surface.

FIG. 2 is a view showing the spacer expander from a peripheral side. The spacer expander having a wave shape with longitudinal amplitude is provided with upper seating tabs 6a for pushing one side rail and lower seating tabs 6b for pushing the other side rail. Each seating tab is provided with raggedness having substantially longitudinal projections and recesses arranged in a circumferential direction, with a top surface of each projection having a small contact area to exert high contact pressure, thereby preventing that the side rails are rotated separately from the spacer expander. As shown in FIGS. 3(a) to 6(b), which are A-A cross sections, the width m of a bottom surface is more than the circumferential length m' of a top surface 62 in each projection, and a surface 63 connecting the top surface 62 of each projection to a recess surface 61 has an outward projecting cross section, so that stress concentration can be avoided to prevent the breakage and wearing of projections, even under vibration, repeated or varying stress, etc. due to a fretting motion. Of course, the outward projecting surface 63 connecting the top surface 62 of each projection to the recess surface 61 may be a curved surface or a polygonal surface, as long as it is outward projecting. In the case of a circular cross section, for example, it may have an arbitrary radius of curvature.

Figure 3A:
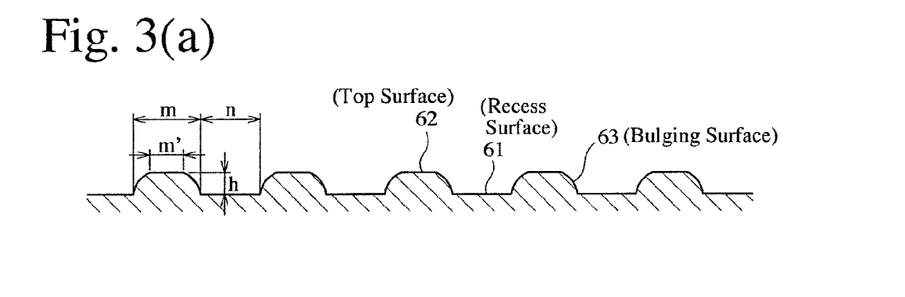
FIG. 3(a) is a cross-sectional view taken along the line A-A in FIG. 2, in which top surfaces of projections are substantially in parallel to a side-rail-pushing surface, the width m of a bottom surface being larger than the circumferential length m' of the top surface in each projection, a surface connecting the top surface to a recess surface having a bulging shape, and the height h of the top surface from the recess surface being relatively large.
Figure 3B:
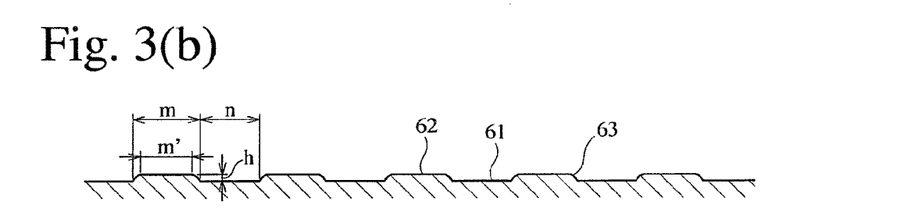
FIG. 3(b) is a cross-sectional view taken along the line A-A in FIG. 2, in which top surfaces of projections are substantially in parallel to a side-rail-pushing surface, the width m of a bottom surface of each projection being larger than the circumferential length m' of the top surface of each projection, a surface connecting the top surface to a recess surface having a bulging shape, and the height h of the top surface from the recess surface being relatively small.
Figure 4A:
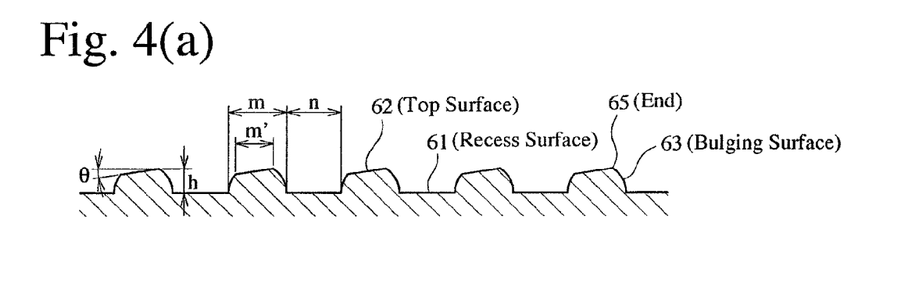
FIG. 4(a) is a cross-sectional view taken along the line A-A in FIG. 2, in which top surfaces of projections are inclined from a side-rail-pushing surface, the width m of a bottom surface of each projection being larger than the circumferential length m' of the top surface of each projection, a surface connecting the top surface to a recess surface having a bulging shape, and the height h of the top surface from the recess surface being relatively large, and in which the inclination angle θ is defined.
Figure 4B:
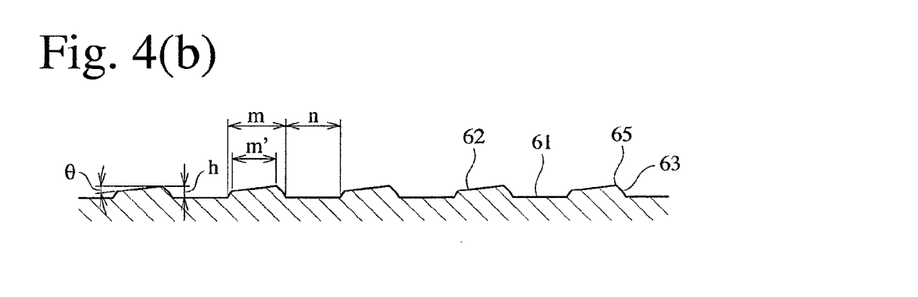
FIG. 4(b) is a cross-sectional view taken along the line A-A in FIG. 2, in which top surfaces of projections are inclined from a side-rail-pushing surface, the width m of a bottom surface of each projection being larger than the circumferential length m' of the top surface of each projection, a surface connecting the top surface to a recess surface having a bulging shape, and the height h of the top surface from the recess surface being relatively small, and in which the inclination angle θ is defined.
Figure 5A:
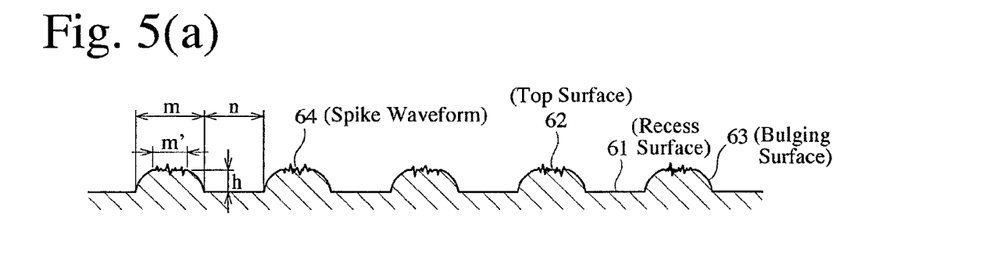
FIG. 5(a) shows a case where each of projections in FIG. 3(a) has a spike waveform on a top surface.
Figure 5B:
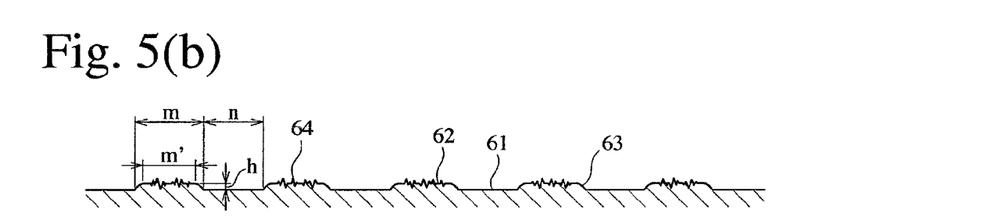
FIG. 5(b) shows a case where each of projections in FIG. 3(b) has a spike waveform on a top surface.
Figure 6A:
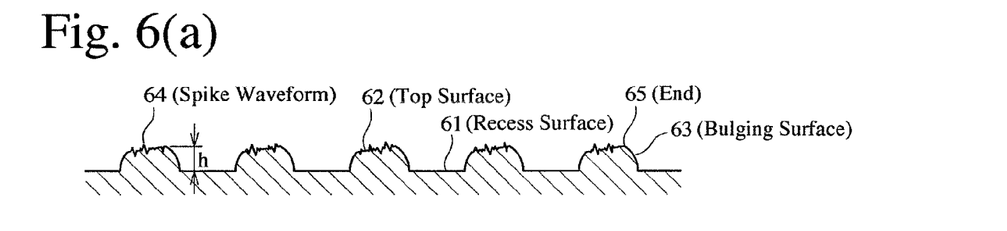
FIG. 6(a) shows a case where each of projections in FIG. 4(a) has a spike waveform on a top surface.
Figure 6B:
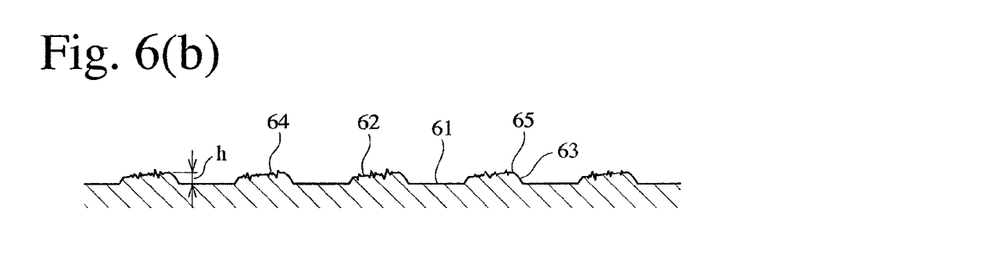
FIG. 6(b) shows a case where each of projections in FIG. 4(b) has a spike waveform on a top surface.

FIGS. 3(a) and 3(b) show top surfaces 62 of projections substantially in parallel to the side-rail-pushing surface 8 of the seating tab, and FIGS. 4(a) and 4(b) show top surfaces 62 of projections inclined from the side-rail-pushing surface 8 of the seating tab. The term "substantially parallel" means that θ is about 0±1°. The inclined top surfaces 62 of projections are effective to prevent the rotation of the side rail 3, because ends 65 of the top surfaces 62 of projections are linear in a substantially longitudinal direction, making them in contact with the side rail 3. As shown in FIGS. 5(a) to 6(b), the top surface 62 of each projection having a spike waveform 64 with sharp tips is more effective. The maximum height Rp of the spike waveform 64 measured by a surface roughness meter is preferably 1-5 μm, more preferably 1-3 μm. The spike waveform 64 would not usually be worn, if their sharp tips bit the side rails 3 to prevent their rotation. Even if the spike waveform were placed under a condition of being worn, the ends 65 of the top surfaces 62 of the projections would be more resistant to breakage than the spike waveform 64, as long as the top surfaces 62 of the projections were inclined. The inclination angle θ defined in the figures [FIGS. 4(a) and 4(b)] is preferably 1-30°, more preferably 1-20°, most preferably 1-10°.

Though prior art (for example, JP 2001-132840 A) indicates that a larger height h of the top surface 62 of each projection from the recess surface 61 provides a longer life, the inventors have found through intensive research that on the contrary, a longer life is obtained with a smaller height h, as long as the separate rotation of side rails 3 is prevented, because a smaller height h of the top surface 62 of each projection from the recess surface 61 provides the projections with smaller stress due to the fretting motion. A ratio (h/m) of the height h of the top surface 62 of each projection from the recess surface 61 to the width m of the bottom surface of each projection is preferably 0.5-10%. As an actual size, the height h of the top surface 62 of each projection from the recess surface 61 is preferably 0.5-20 μm, more preferably 0.5-10 μm, further preferably 0.5 μm or more and less than 6 μm, most preferably 0.5-5 μm. When the top surface 62 of each projection is inclined, a larger height is regarded as the height h of the top surface 62 of each projection from the recess surface 61, without including the height of the spike waveform 64. The shapes of projections and recesses, the pitch (m+n), and sizes of m, m', n, h, etc. can be measured by a contact-type or non-contact-type (for example, laser) meter (including a surface roughness meter).

Figure 7A:
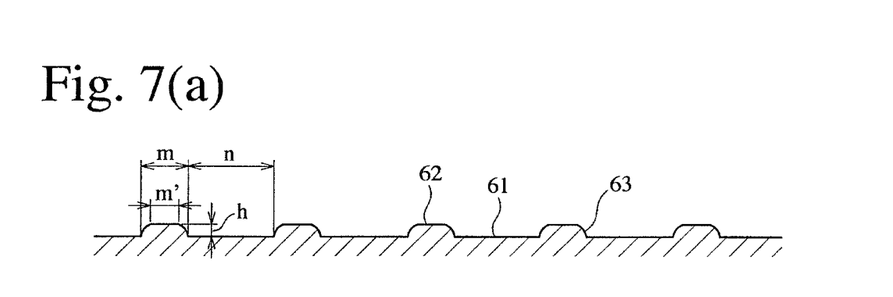
FIG. 7(a) is a cross-sectional view taken along the line A-A in FIG. 2, in which the total circumferential length of top surfaces of projections is about 35% of the circumferential length of each seating tab.
Figure 7B:
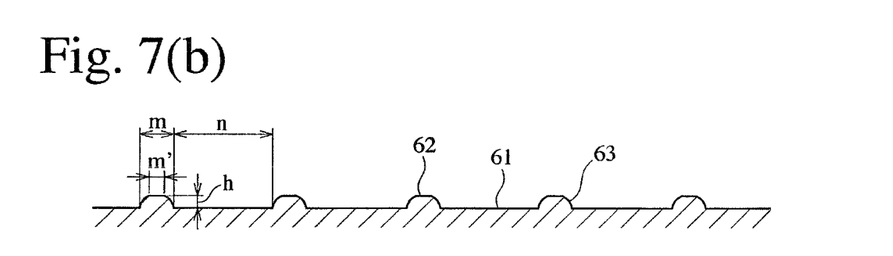
FIG. 7(b) is a cross-sectional view taken along the line A-A in FIG. 2, in which the total circumferential length of top surfaces of projections is about 20% of the circumferential length of each seating tab.

A circumferential length ratio of top surfaces of projections to each seating tab may be determined, taking into consideration the tension of the combined oil control ring. At a lower tension, the circumferential length ratio of the top surfaces of projections may be smaller to obtain a desired contact surface pressure. Depending on the tension of the combined oil control ring, the total circumferential length of the top surfaces of projections in each seating tab is preferably 30-70%, 20-50%, or 15-25% of the circumferential length of each seating tab. FIGS. 7(a) and 7(b) show examples of projections and recesses having different circumferential length ratios of top surfaces of projections in the seating tab. A ratio of the total circumferential length (Σm') of top surfaces of projections to the circumferential length [Σ(m+n)] of the seating tab is about 35% in FIG. 7(a), and about 20% in FIG. 7(b).

The seating tabs of a spacer expander used in the combined oil control ring of the present invention are basically worked by the method shown in FIGS. 8(a) to 8(c), which is disclosed in JP 3-193221 A. Namely, working rolls 100 each having desired projections and recesses are pressed onto the side-rail-pushing surfaces 8 of the seating tabs, so that projections and recesses on working surfaces 110 of the working rolls are transferred to the side-rail-pushing surfaces 8 of the seating tabs by rolling. Because projections and recesses on the working rolls 100 are transferred to the seating tabs with inversed shapes, the circumferential lengths (m, m', n) of projections and recesses, inclination angle θ, the curvatures of side surfaces 63 (connecting the top surfaces to the recess surfaces), a spike waveform, etc. are determined by the shapes of projections and recesses and surface conditions of the working rolls 100, lubrication conditions during the rolling, etc. It should be noted that m' represents a distance in parallel to the circumferential direction, not variable depending on the inclination angle θ.

The height h of the top surface 62 of each projection is determined by the pressing depth of the working roll 100. If the working roll 100 had deeper recesses than its pressing depth, a shear-worked surface of the seating tab before rolling would remain on the top surface 62 of each projection. When the top surface 62 of each projection has a small inclination angle, projections with top surfaces 62 inclined in one direction can be formed by using working rolls 100 with projections having no inclined top surfaces (θ=0), as long as a rotation shaft of a lower roller 200, on which the spacer expander 2 is set, and both rotation shafts of working rolls 100, 100 are offset in parallel from the axis perpendicular to the conveying direction of the spacer expander in FIG. 8.

Spike waveforms 64 on the top surfaces 62 of the projections can be obtained by leaving spike waveforms of shear-worked seating tabs, transferring the surface conditions of the working rolls 100, or pressing working surfaces 110 of the working rolls onto the side-rail-pushing surfaces 8 of the seating tabs of the spacer expander without lubrication. Because plastically worked surfaces of the seating tabs may not be completely flat, the top surfaces of projections are not restricted to completely flat surfaces in the present invention, even when the top surfaces do not have a spike waveform.

Example 1

A spacer expander of SUS304 and side rails of SUS440 each as wide as 0.4 mm were formed to provide a combined oil ring having a nominal diameter of 75 mm, a combined nominal width of 2.0 mm, and a combined thickness of 2.5 mm. The spacer expander was obtained by locally bending and shearing a SUS304 strip with gears to form seating tabs each having a circumferential length of 1.28 mm, rolling the seating tabs to form projections having bulging side surfaces and recesses (pitch: 0.18 mm, h: 0.02 mm, m: 0.116 mm, and m': 0.056 mm), and finally coiling the strip to a perfect circle. The rolling was conducted with lubrication.

Figure 9:
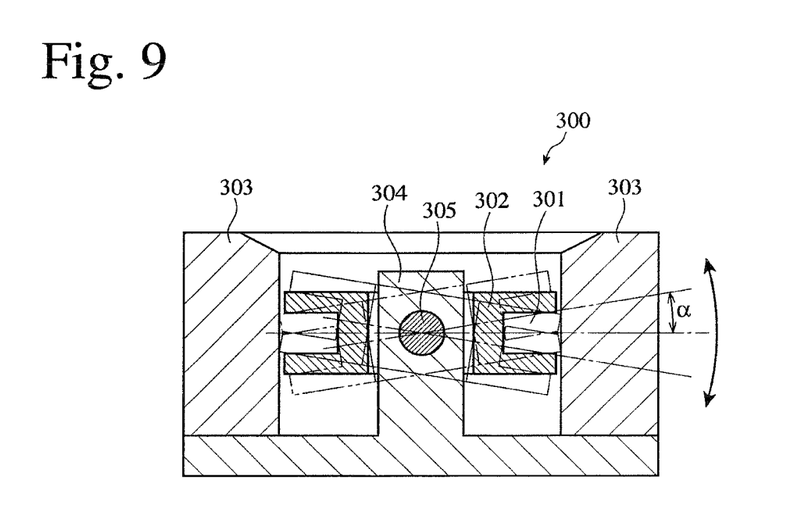
FIG. 9 is a view schematically showing a test apparatus for evaluating the separate rotation of side rails.

The resultant combined oil ring was evaluated, using an apparatus for evaluating the separate rotation of side rails as shown in FIG. 9. In this apparatus 300, a combined oil ring was assembled in a holder (piston) 302 having a pseudo-oil ring groove 301, and swung around a fulcrum 305 in a support 304 of a cylinder (pseudo-cylinder) 303 to evaluate the separate rotation of side rails. With a combined oil control comprising two upper and lower side rails each deviating by 30° in opposite directions from the joint position of a spacer expander assembled in the above holder (pseudo-piston) 302, the test was conducted by swinging the combined oil ring at a speed of 10 reciprocations per second for 10 minutes at each swing angle α changing from 0.5° to 7.5° by every 0.5°. A swing angle at which the separate rotation of side rails occurred was observed to evaluate the capability of preventing the separate rotation of side rails. A larger swing angle, at which the rotation starts, means that the combined oil ring has a structure more resistance to the rotation of side rails. In the combined oil control ring of Example 1, the separate rotation of side rails started at an angle of 6.5°.

Using a four-cylinder gasoline engine having a displacement of 1500 $cm^3$, the combined oil control ring of Example 1 was evaluated with respect to the wear of inner surfaces of the seating tabs and side rails and oil consumption. A top ring used had a barrel face on the periphery, and a second ring used had a tapered face on the periphery. The test conditions were 5,000 rpm for 48 hours with wide-open throttle (WOT). The inner surfaces of the seating tabs and the side rails were worn by 4 μm in total, and the oil consumption was 14 g/hr.

Example 2

A spacer expander was produced in the same manner as in Example 1, except for rolling the seating tabs under such conditions as having projections with bulging side surfaces and recesses (pitch: 0.18 mm, h: 0.01 mm, m: 0.105 mm, and m': 0.062 mm), and the evaluation of the separate rotation of side rails and the engine test were conducted in the same manner as in Example 1. The side rails were not rotated even at a swing angle of 7.5°, an upper limit in the evaluation apparatus of the separate rotation of side rails. The wear was 1 μm or less, and the oil consumption was 8 g/hr.

Examples 3-7

Each spacer expander was produced in the same manner as in Example 1, except for rolling the seating tabs under such conditions as having projections with bulging side surfaces and recesses (pitch: 0.18 mm, h: 0.001-0.01 mm, m: 0.09-0.12 mm, and m': 0.075-0.102 mm), and the evaluation of the separate rotation of side rails and the engine test were conducted in the same manner as in Example 1. The specifications of projections and recesses in the seating tabs (height h of the top surface of each projection, width m of the bottom surface of each projection, circumferential length m' of each top surface, h/m, contact area ratio, etc.) are shown in Table 1, and the evaluation results of the separate rotation of side rails and the engine test results are shown in Table 2, both together with those of Examples 1 and 2. In Examples 3-7, the separate rotation of side rails did not occur even at a swing angle of 7.5°, an upper limit in the evaluation apparatus of the separate rotation of side rails, and the wear was 1 μm or less, and the oil consumption was 10 g/hr or less.

TABLE 1

| No.* | Height h$^{(1)}$ (mm) | Width m$^{(2)}$ (mm) | Length m'$^{(3)}$ (mm) | h/m (%) | Contact Area Ratio (%) |
|---|---|---|---|---|---|
| Example 1 | 0.02 | 0.116 | 0.056 | 17 | 31 |
| Example 2 | 0.01 | 0.105 | 0.062 | 9.5 | 35 |
| Example 3 | 0.01 | 0.102 | 0.075 | 9.8 | 42 |
| Example 4 | 0.008 | 0.120 | 0.075 | 6.7 | 42 |
| Example 5 | 0.005 | 0.112 | 0.102 | 4.5 | 57 |
| Example 6 | 0.003 | 0.102 | 0.095 | 2.9 | 53 |
| Example 7 | 0.001 | 0.090 | 0.087 | 1.1 | 48 |

Note:
$^{(1)}$The height h of each top surface.
$^{(2)}$The width m of the bottom surface of each projection.
$^{(3)}$The circumferential length m' of each top surface.
*Seating tabs were as long as 1.28 mm

TABLE 2

| No. | Rotation Start Angle (°)$^{(1)}$ | Wear (Seating tab + Rail) (μm) | Oil Consumption (g/hr) |
|---|---|---|---|
| Example 1 | 6.5 | 4 | 14 |
| Example 2 | >7.5 | <1 | 8 |
| Example 3 | >7.5 | <1 | 7 |
| Example 4 | >7.5 | <1 | 7 |
| Example 5 | >7.5 | <1 | 5 |
| Example 6 | >7.5 | <1 | 6 |
| Example 7 | >7.5 | <1 | 7 |

Note:
$^{(1)}$The angle at which the separate rotation of side rails started.

Examples 8-12

Each spacer expander was produced in the same manner as in Example 1, except for rolling the seating tabs under such conditions as having projections with bulging side surfaces and recesses (pitch: 0.18 mm, h: 0.001-0.01 mm, m: 0.059-0.078 mm, and m': 0.049-0.060 mm), and the evaluation of the separate rotation of side rails and the engine test were conducted in the same manner as in Example 1. Each spacer expander had slightly smaller tension than in Examples 1-7. The specifications of projections and recesses in the seating tabs are shown in Table 3, and the evaluation results of the separate rotation of side rails and the engine test results are shown in Table 4. In Examples 10-12, the separate rotation of side rails did not occur even at a swing angle of 7.5°, an upper limit in the evaluation apparatus of the separate rotation of side rails, and the wear was 1 μm or less, and the oil consumption was 10 g/hr or less.

TABLE 3

| No.* | Height h$^{(1)}$ (mm) | Width m$^{(2)}$ (mm) | Length m'$^{(3)}$ (mm) | h/m (%) | Contact Area Ratio (%) |
|---|---|---|---|---|---|
| Example 8 | 0.01 | 0.078 | 0.057 | 13 | 32 |
| Example 9 | 0.008 | 0.071 | 0.051 | 11 | 28 |
| Example 10 | 0.005 | 0.070 | 0.059 | 7.1 | 33 |
| Example 11 | 0.003 | 0.059 | 0.049 | 5.1 | 27 |
| Example 12 | 0.001 | 0.063 | 0.060 | 1.6 | 33 |

Note:
$^{(1)}$The height h of each top surface.
$^{(2)}$The width m of the bottom surface of each projection.
$^{(3)}$The circumferential length m' of each top surface.
*Seating tabs were as long as 1.28 mm

TABLE 4

| No. | Rotation Start Angle (°)$^{(1)}$ | Wear (Seating tab + Rail) (μm) | Oil Consumption (g/hr) |
|---|---|---|---|
| Example 8 | 7.0 | 3 | 12 |
| Example 9 | 7.0 | 2 | 10 |
| Example 10 | >7.5 | <1 | 7 |
| Example 11 | >7.5 | <1 | 5 |
| Example 12 | >7.5 | <1 | 6 |

Note:
$^{(1)}$The angle at which the separate rotation of side rails started.

Examples 13-17

Each spacer expander was produced in the same manner as in Example 1, except for rolling the seating tabs under such conditions as having projections with bulging side surfaces and recesses (pitch: 0.18 mm, h: 0.001-0.01 mm, m: 0.037-0.053 mm, and m': 0.028-0.039 mm), and the evaluation of the separate rotation of side rails and the engine test were conducted in the same manner as in Example 1. Each spacer expander had smaller tension than in Examples 8-12. The specifications of projections and recesses in the seating tabs are shown in Table 5, and the evaluation results of the separate rotation of side rails and the engine test results are shown in Table 6. In Examples 16 and 17, the separate rotation of side rails did not occur even at a swing angle of 7.5°, an upper limit in the evaluation apparatus of the separate rotation of side rails, and the wear was 1 μm or less, and the oil consumption was 10 g/hr or less.

TABLE 5

| No.* | Height h$^{(1)}$ (mm) | Width m$^{(2)}$ (mm) | Length m'$^{(3)}$ (mm) | h/m (%) | Contact Area Ratio (%) |
|---|---|---|---|---|---|
| Example 13 | 0.01 | 0.053 | 0.036 | 19 | 20 |
| Example 14 | 0.008 | 0.048 | 0.030 | 17 | 17 |
| Example 15 | 0.005 | 0.047 | 0.037 | 11 | 21 |
| Example 16 | 0.003 | 0.037 | 0.028 | 8.0 | 16 |
| Example 17 | 0.001 | 0.041 | 0.039 | 2.5 | 21 |

Note:
$^{(1)}$The height h of each top surface.
$^{(2)}$The width m of the bottom surface of each projection.
$^{(3)}$The circumferential length m' of each top surface.
*Seating tabs were as long as 1.28 mm

TABLE 6

| No. | Rotation Start Angle (°)$^{(1)}$ | Wear (Seating tab + Rail) (μm) | Oil Consumption (g/hr) |
|---|---|---|---|
| Example 13 | 6.5 | 3 | 11 |
| Example 14 | 6.5 | 2 | 10 |
| Example 15 | 7.0 | 2 | 10 |
| Example 16 | >7.5 | <1 | 7 |
| Example 17 | >7.5 | <1 | 8 |

Note:
$^{(1)}$The angle at which the separate rotation of side rails started.

Comparative Example 1

A spacer expander was produced in the same manner as in Example 1, except for changing the shapes of projections and recesses in the seating tabs to a rectangular waveform with m=m' (=0.056 mm), and the height h of the top surface of each projection to 0.05 mm, and the evaluation of the separate rotation of side rails and the engine test were conducted in the same manner as in Example 1. The specifications of projections and recesses were h/m of 89%, and a contact area ratio of 31%. Though the separate rotation of side rails did not occur at a swing angle of 7.5°, an upper limit in the evaluation apparatus of the separate rotation of side rails, the wear was as much as 14 μm, resulting in reduced tension and oil consumption of 26 g/hr.

Comparative Example 2

A dimpled spacer expander was produced by blasting the seating tabs with silicon carbide particles instead of forming projections and recesses with the working rolls in Example 1, and the evaluation of the separate rotation of side rails and the engine test were conducted in the same manner as in Example 1. The rotation start angle of side rails was 2.5°, the wear was 10 μm, and the oil consumption was 32 g/hr.

Example 18

A spacer expander was produced in the same manner as in Example 2, except for rolling the seating tabs by working rolls whose working surfaces had a surface roughness curve with the maximum depth Rv of 3.2 μm, without lubrication, and the separate rotation of side rails was evaluated in the same manner as in Example 1. The separate rotation of side rails did not occur even at a swing angle of 7.5°, an upper limit in the evaluation apparatus of the separate rotation of side rails.

Examples 19-23

Each spacer expander was produced in the same manner as in Example 18, except for using working rolls for forming seating tabs having top surfaces inclined in one direction with an angle θ of 3-33° as shown in Table 7, and the separate rotation of side rails was evaluated in the same manner as in Example 1. The results are shown in Table 7 together with those of Example 18. With an inclination angle of 3-28°, the separate rotation of side rails did not occur even at a swing angle of 7.5°, an upper limit in the evaluation apparatus of the separate rotation of side rails.

Examples 24-28

Each spacer expander was produced in the same manner as in Examples 19-23, except for conducting the rolling with lubrication, and the separate rotation of side rails was evaluated in the same manner as in Example 1. The results are shown in Table 7 together with those of Examples 18-23. With an inclination angle θ of 3-28°, the separate rotation of side rails did not occur even at a swing angle of 7.5°, an upper limit in the evaluation apparatus of the separate rotation of side rails.

TABLE 7

| No.* | Spike Waveform | | | Rotation Start Angle[1] (°) |
|---|---|---|---|---|
| | Inclination Angle θ | Existence | Maximum Height (μm) | |
| Example 18 | 0 | Yes | 2.5 | 7.5 |
| Example 19 | 3 | Yes | 3.0 | 7.5 |
| Example 20 | 8 | Yes | 3.1 | 7.5 |
| Example 21 | 17 | Yes | 2.7 | 7.5 |
| Example 22 | 28 | Yes | 3.3 | 7.5 |
| Example 23 | 33 | Yes | 2.8 | 6.5 |
| Example 24 | 3 | No | — | 7.5 |
| Example 25 | 8 | No | — | 7.5 |
| Example 26 | 17 | No | — | 7.5 |
| Example 27 | 28 | No | — | 7.5 |
| Example 28 | 33 | No | — | 6.0 |

Note:
[1] The rotation start angle of side rails

*Pitch: 0.18 mm, h: 0.01 mm, m: 0.105 mm, and m': 0.062 mm, with bulging side surfaces, and the seating tabs were as long as 1.28 mm

Examples 29-33

Each spacer expander was produced in the same manner as in Example 18, except for rolling the seating tabs under such conditions as having projections with bulging side surfaces and recesses (pitch: 0.18 mm, h: 0.001-0.01 mm, m: 0.09-0.12 mm, m': 0.075-0.102 mm, and θ: 9°), and the separate rotation of side rails was evaluated in the same manner as in Example 1. The specifications (height h of the top surface of each projection, width m of the bottom surface of each projection, circumferential length m' of the top surface of each projection, h/m, contact area ratio, etc.) of projections and recesses in the seating tabs are shown in Table 8 together with the test results of the rotation start angle of side rails. In any Examples, the separate rotation of side rails did not occur even at a swing angle of 7.5°, an upper limit in the evaluation apparatus of the separate rotation of side rails.

TABLE 8

| No.* | Height h[1] (mm) | Width m[2] (mm) | Length m'[3] (mm) | h/m (%) | Contact Area Ratio (%) | Rotation Start Angle[4] (°) |
|---|---|---|---|---|---|---|
| Example 29 | 0.01 | 0.102 | 0.075 | 9.8 | 42 | 7.5 |
| Example 30 | 0.008 | 0.120 | 0.075 | 6.7 | 42 | 7.5 |
| Example 31 | 0.005 | 0.112 | 0.102 | 4.5 | 57 | 7.5 |
| Example 32 | 0.003 | 0.102 | 0.095 | 2.9 | 53 | 7.5 |
| Example 33 | 0.001 | 0.090 | 0.087 | 1.1 | 48 | 7.5 |

Note:
[1] The height h of each top surface.
[2] The width m of the bottom surface of each projection.
[3] The circumferential length m' of each top surface.
[4] The rotation start angle of side rails.

*The top surface of each projection was inclined at θ of 9° and had a spike waveform, and the seating tabs were as long as 1.28 mm.

Examples 34-38

Each spacer expander was produced in the same manner as in Example 18, except for rolling the seating tabs under such conditions as having projections with bulging side surfaces and recesses (pitch: 0.18 mm, h: 0.001-0.01 mm, m: 0.059-0.078 mm, m': 0.049-0.060 mm, and θ: 9°), and the separate rotation of side rails was evaluated in the same manner as in Example 1. Each spacer expander had slightly smaller tension than in Examples 29-33. The specifications (height h of the top surface of each projection, width m of the bottom surface of each projection, circumferential length m' of the top surface of each projection, h/m, contact area ratio, etc.) of projections and recesses in the seating tabs are shown in Table 9 together with the test results of the rotation start angle of side rails. In any Examples, the separate rotation of side rails did not occur even at a swing angle of 7.5°, an upper limit in the evaluation apparatus of the separate rotation of side rails.

TABLE 9

| No. | Height h[1] (mm) | Width m[2] (mm) | Length m'[3] (mm) | h/m (%) | Contact Area Ratio (%) | Rotation Start Angle[4] (°) |
|---|---|---|---|---|---|---|
| Example 34 | 0.01 | 0.078 | 0.057 | 13 | 32 | 7.5 |
| Example 35 | 0.008 | 0.071 | 0.051 | 11 | 28 | 7.5 |
| Example 36 | 0.005 | 0.070 | 0.059 | 7.1 | 33 | 7.5 |
| Example 37 | 0.003 | 0.059 | 0.049 | 5.1 | 27 | 7.5 |
| Example 38 | 0.001 | 0.063 | 0.060 | 1.6 | 33 | 7.5 |

Note:
[1] The height h of each top surface.
[2] The width m of the bottom surface of each projection.
[3] The circumferential length m' of each top surface.
[4] The rotation start angle of side rails.
*The top surface of each projection was inclined at θ of 9° and had a spike waveform, and the seating tabs were as long as 1.28 mm.

Examples 39-43

Each spacer expander was produced in the same manner as in Example 18, except for rolling the seating tabs under such conditions as having projections with bulging side surfaces and recesses (pitch: 0.18 mm, h: 0.001-0.01 mm, m: 0.037-0.053 mm, m': 0.028-0.039 mm, and θ: 9°), and the separate rotation of side rails was evaluated in the same manner as in Example 1. Each spacer expander had smaller tension than in Examples 34-38. The specifications (height h of the top surface of each projection, width m of the bottom surface of each projection, circumferential length m' of the top surface of each projection, h/m, contact area ratio, etc.) of projections and recesses in the seating tabs are shown in Table 10 together with the test results of the rotation start angle of side rails. In any Examples, the separate rotation of side rails did not occur even at a swing angle of 7.5°, an upper limit in the evaluation apparatus of the separate rotation of side rails.

TABLE 10

| No. | Height h[1] (mm) | Width m[2] (mm) | Length m'[3] (mm) | h/m (%) | Contact Area Ratio (%) | Rotation Start Angle[4] (°) |
|---|---|---|---|---|---|---|
| Example 39 | 0.01 | 0.053 | 0.036 | 19 | 20 | 7.5 |
| Example 40 | 0.008 | 0.048 | 0.030 | 17 | 17 | 7.5 |
| Example 41 | 0.005 | 0.047 | 0.037 | 11 | 21 | 7.5 |
| Example 42 | 0.003 | 0.037 | 0.028 | 8.0 | 16 | 7.5 |
| Example 43 | 0.001 | 0.041 | 0.039 | 2.5 | 21 | 7.5 |

Note:
[1] The height h of each top surface.
[2] The width m of the bottom surface of each projection.
[3] The circumferential length m' of each top surface.
[4] The rotation start angle of side rails.
*The top surface of each projection was inclined at θ of 9° and had a spike waveform, and the seating tabs were as long as 1.28 mm.

Examples 44-50

The same engine test as in Example 1 was conducted on the combined oil control rings of Example 18 (Example 44), Example 20 (Example 45), Example 25 (Example 46), Example 31 (Example 47), Example 36 (Example 48), Example 41 (Example 49), and Example 42 (Example 50). The test results are shown in Table 11. In Examples 44-48 and Example 50 (h/m: 10% or less) except for Example 49, the wear was 1 μm or less, and the oil consumption was 10 g/hr or less.

TABLE 11

| No. | Wear (Seating tab + Rail) (μm) | Oil Consumption (g/hr) |
|---|---|---|
| Example 44 | <1 | 8 |
| Example 45 | <1 | 9 |
| Example 46 | <1 | 5 |
| Example 47 | <1 | 7 |
| Example 48 | <1 | 6 |
| Example 49 | 3 | 11 |
| Example 50 | <1 | 7 |

Effect of the Invention

The combined oil control ring of the present invention can prevent projections from being worn, particularly broken, by fretting fatigue during use, because it comprises a spacer expander having seating tabs with projections and recesses, a top surface of each projection having a small contact area to increase contact surface pressure to prevent the rotation of side rails, the width m of a bottom surface of each projection being larger than the circumferential length m' of the top surface of each projection, and a surface (side surface) connecting the top surface to a recess surface having a bulging shape. With the top surfaces inclined from the side-rail-pushing surface and/or having a spike waveform, the rotation of side rails can be further prevented. When the top surfaces of projections are inclined in one circumferential direction, one end of each top surface is ideally in line contact with the side rails, providing a further rotation-preventing effect. The spike waveform further increases friction resistance with the side rails effectively. Even if a sharp-tip spike waveform were worn, one linear end of each top surface would not be worn easily. With the ratio of projections adjusted in a desired range, the contact surface pressure can be further increased, keeping preventing the rotation of side rails. Even in a low-tension combined oil control ring, the adjustment of the ratio of top surfaces in a desired range increases contact surface pressure, keeping preventing the rotation of side rails.

What is claimed is:

1. A combined oil control ring comprising two upper and lower side rails, and a spacer expander sandwiched thereby,
    said spacer expander having seating tabs on the inner side for pushing inner surfaces of said side rails;
    a side-rail-pushing surface of each of said seating tabs having a plurality of substantially longitudinal projections and recesses, the projections and recesses alternately arranged in a circumferential direction;
    the width m of a bottom surface being larger than the circumferential length m' of a top surface in each projection; and
    a surface connecting said top surface of each projection to said recess surface having a bulging shape.

2. The combined oil control ring according to claim 1, wherein said top surface of each projection is substantially in parallel to said side-rail-pushing surface.

3. The combined oil control ring according to claim 1, wherein said top surface of each projection is inclined from said side-rail-pushing surface.

4. The combined oil control ring according to claim 3, wherein the inclination angle
    of said top surface of each projection is in a range of 1-30°.

5. The combined oil control ring according to claim 3, wherein a ratio (h/m) of the height h of said top surface from said recess surface to the width m of the bottom surface of said projection is 0.5-10%.

6. The combined oil control ring according to claim 1, wherein the height h of said top surface from said recess surface is 0.5-20 μm.

7. The combined oil control ring according to claim 3, wherein the height h of said top surface from said recess surface is 0.5 μm or more and less than 6 μm.

8. The combined oil control ring according to claim 3, wherein the total circumferential length of said top surfaces of projections in said seating tab is 30-70% of the circumferential length of said seating tab.

9. The combined oil control ring according to claim 3, wherein the total circumferential length of said top surfaces of projections in said seating tab is 20-50% of the circumferential length of said seating tab.

10. The combined oil control ring according to claim 3, wherein the total circumferential length of said top surfaces of projections in said seating tab is 15-25% of the circumferential length of said seating tab.

* * * * *